No. 644,863. Patented Mar. 6, 1900.
C. KORDENAT.
BICYCLE SUPPORT.
(Application filed Dec. 13, 1898.)
(No Model.)
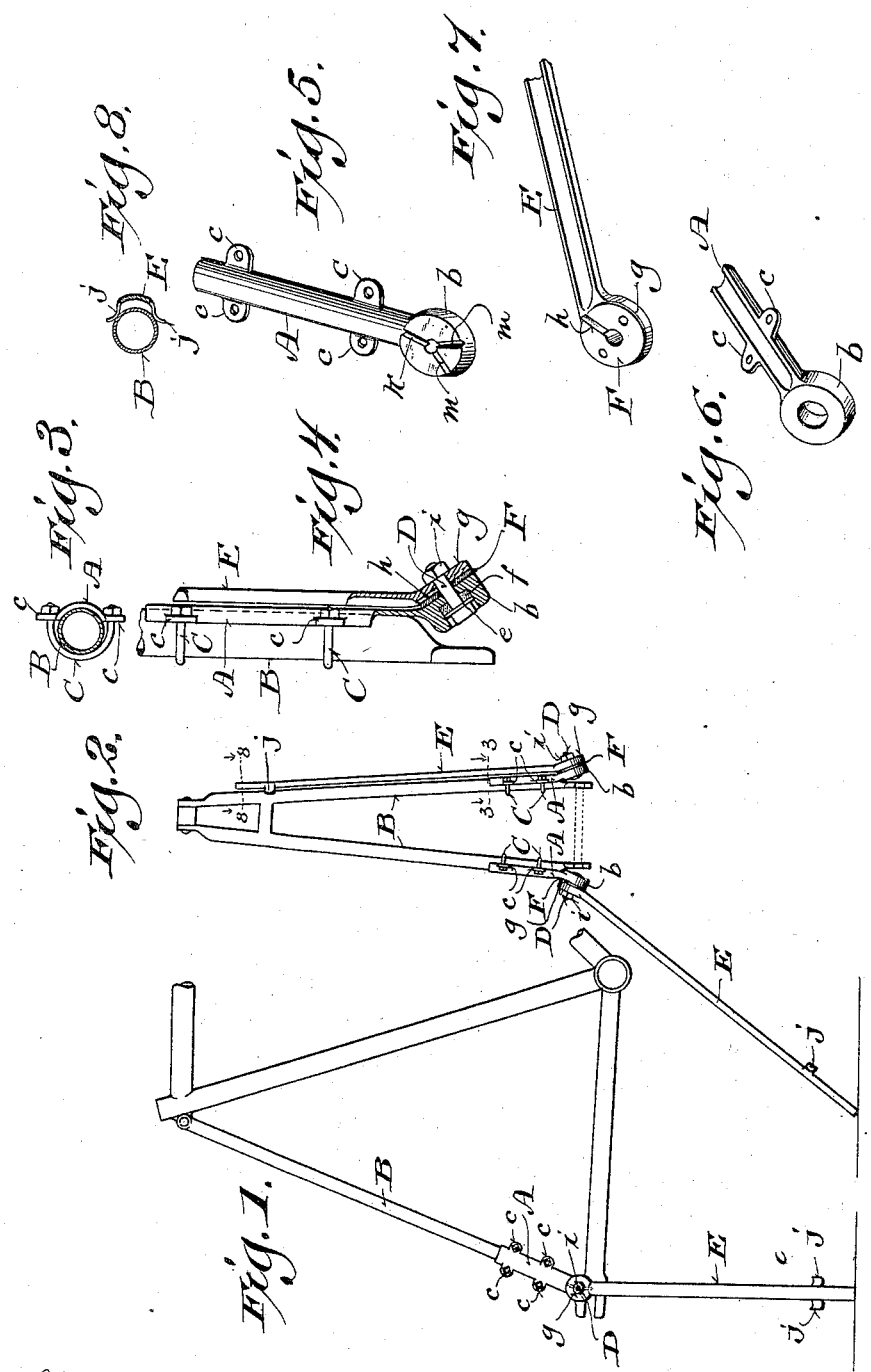
Witnesses:
Geo. W. Young
N. E. Oliphant
Inventor
Carl Kordenat.
By H. G. Underwood
N. Roeney

UNITED STATES PATENT OFFICE.

CARL KORDENAT, OF REEDSBURG, WISCONSIN.

BICYCLE-SUPPORT.

SPECIFICATION forming part of Letters Patent No. 644,863, dated March 6, 1900.

Application filed December 13, 1898. Serial No. 699,130. (No model.)

*To all whom it may concern:*

Be it known that I, CARL KORDENAT, a citizen of the United States, and a resident of Reedsburg, in the county of Sauk and State of Wisconsin, have invented certain new and useful Improvements in Bicycle-Supports; and I do hereby declare that the following is a full, clear, and exact description thereof.

My invention has for its object to provide light, simple, and economical bicycle attachments capable of ready application to be normally out of the way, but which serve at option of riders as means for supporting the bicycles in upright position when not in use.

Therefore said invention consists in certain peculiarities of construction and combination of parts hereinafter particularly set forth with reference to the accompanying drawings and subsequently claimed.

Figure 1 of the drawings represents a side elevation of a portion of a bicycle-frame provided with an attachment in accordance with my invention, the movable part of said attachment being swung down to working position; Fig. 2, a rear view of said frame provided with two attachments in accordance with my invention, the movable part of one being swung down; Fig. 3, a detail plan view, partly in horizontal section, on the plane indicated by line 3 3 in the preceding figure; Fig. 4, a detail rear elevation, partly in section; Figs. 5, 6, and 7, perspective views illustrating elements of the aforesaid attachment; and Fig. 8 a detail plan view, partly in horizontal section, on the plane indicated by line 8 8 in the second figure of the series.

Referring by letter to the drawings, A represents a bracket made to fit a rear-fork brace B of a bicycle-frame, the lower end of this bracket being in the form of an outwardly-offset disk *b*, having a countersunk central aperture, the outer face of this disk being provided with a plurality of depressions, herein shown in the form of radial grooves. The bracket A is also provided with apertured ears *c* in pairs at different elevations, and extending through each pair of ears are the screw-threaded ends of a clip C, engaged by clamp-nuts, that are tightened to fasten said bracket on the aforesaid rear-fork brace of a bicycle-frame.

Extending through the central aperture of the bracket-disk *b* is a bolt D, having its head in contact with a metal washer *e*, facing a rubber or other spring washer *f*, these washers being within the countersink of said bracket-disk, isolated from dirt and moisture.

Bolt D constitutes a pivot for the offset disk end *g* of a swing-arm E, the angle of offset being the same as that of the bracket-disk *b* above specified. As herein shown, an inner face-plate F is riveted to the disk end of the swing-arm, although it may be otherwise fastened in place, and this face-plate is provided with a projection such as the radial rib *h* for engagement with the depressions in the opposing outer side of the bracket-disk *b* aforesaid, a nut *i* being run on the pivot-bolt D against said disk end of the swing-arm.

The swing-arm approximates the length of the rear-fork brace of the bicycle-frame and is provided with upper spring-ears *j* for automatic clamping contact with said brace. As herein shown, the swing-arm may be made to simulate the outward appearance of the rear-fork brace to which it is connected.

One radial depression *k* in the offset disk end of bracket A is shown alined with the rear-fork brace to which said bracket is clamped, and when the arm E is swung up the projection *h*, constituting an integral part of said arm or of a face-plate made fast to the disk end of same, engages with the aforesaid depression to assist in retention of the aforesaid arm in elevated position out of use. The spring-washer above specified permits sufficient play of the arm E on the pivot-bolt D to provide for engagement of the projection *h* with depression *k* above specified or its disengagement therefrom. The other radial depressions *m* shown in the offset disk end of bracket A are so disposed that said bracket may be made to serve on either rear-fork brace of a bicycle-frame, the projection *h* of the arm E being engaged with the proper one of these latter depressions when said arm is swung down to stand at an acute angle to said brace and serve as a support for holding the bicycle in upright position out of use. It is obvious that the swing-arm may be provided with the depressions and the projection arranged upon the disk end of the bracket, this being a mere reversal of what is herein shown.

In Fig. 2 I show that each of the two rear-fork braces of a bicycle-frame may be provided with an attachment similar to that herein particularly shown and described.

Having thus described my invention, what I claim as new, and desire to secure by Letters Patent, is—

A bicycle-support comprising a bracket attachable to a rear-fork brace of a bicycle and having its lower end in the form of an outwardly-offset disk provided with a countersunk central aperture, a spring-washer located in the countersink of the disk-aperture isolated from dirt and moisture, a pivot-bolt having the head thereof within said disk-aperture in opposition to the spring-washer, an arm having one end thereof in the form of an apertured disk loose on the pivot-bolt, a nut run on said pivot-bolt against the latter disk, and a radial projection on one of said disks engageable with any one of a plurality of radial depressions in the opposing disk, these depressions being so disposed that said arm may be locked in elevated position parallel to the fork-brace or in swung-down position as a support for the bicycle at an acute angle to said brace.

In testimony that I claim the foregoing I have hereunto set my hand, at Reedsburg, in the county of Sauk and State of Wisconsin, in the presence of two witnesses.

CARL KORDENAT.

Witnesses:
WM. RIGGERT,
GEO. F. MORSE.